United States Patent

Stein

[15] 3,665,187
[45] May 23, 1972

[54] EQUIPMENT FOR RADIOGRAPHY OF PIPELINES AND CLOSED VESSELS

[72] Inventor: Stephen Stein, London, England
[73] Assignee: National Research Development Corporation, London, England
[22] Filed: Dec. 24, 1968
[21] Appl. No.: 786,576

[30] Foreign Application Priority Data

Dec. 27, 1967 Great Britain.....................58,629/67

[52] U.S. Cl..................250/83.3 D, 250/65 R, 250/106 VC
[51] Int. Cl......................................................G03b 41/16
[58] Field of Search............250/52, 65, 83.3 D, 106, 106 VC

[56] References Cited

UNITED STATES PATENTS 3,064,127  11/1962  Green et al. .......................250/106 X
3,492,477  1/1970  Arnesen..................................250/65

Primary Examiner—James W. Lawrence
Assistant Examiner—A. L. Birch
Attorney—Cushman, Darby & Cushman

[57] ABSTRACT

A pipeline crawler in the form of a self-propelled vehicle is controlled by a radiation detector carried on the vehicle. The vehicle carries a powerful radiation source and a movable shield for the source which is normally in the closed position. On energization of the detector from a weak radiation source placed outside the pipe the vehicle is stopped by the activation of its brakes and the radiation shield opens to expose the source. A timing mechanism operates to close the shield, release the brakes and restart the vehicle after a predetermined time.

7 Claims, 2 Drawing Figures

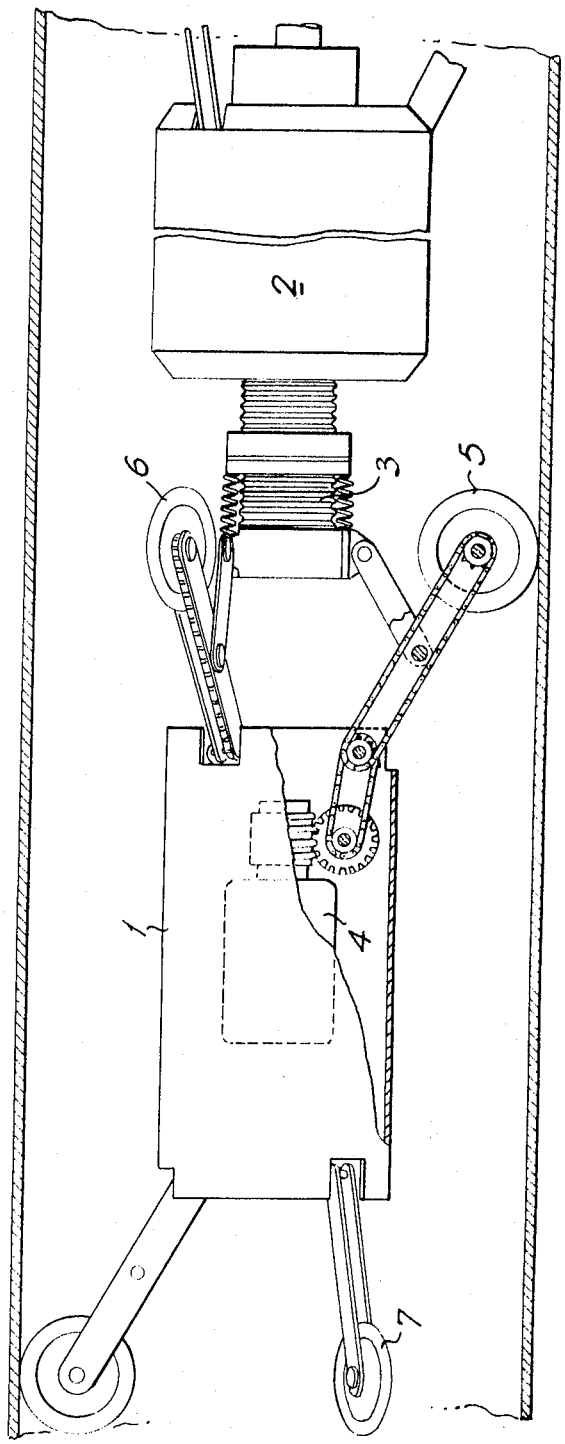

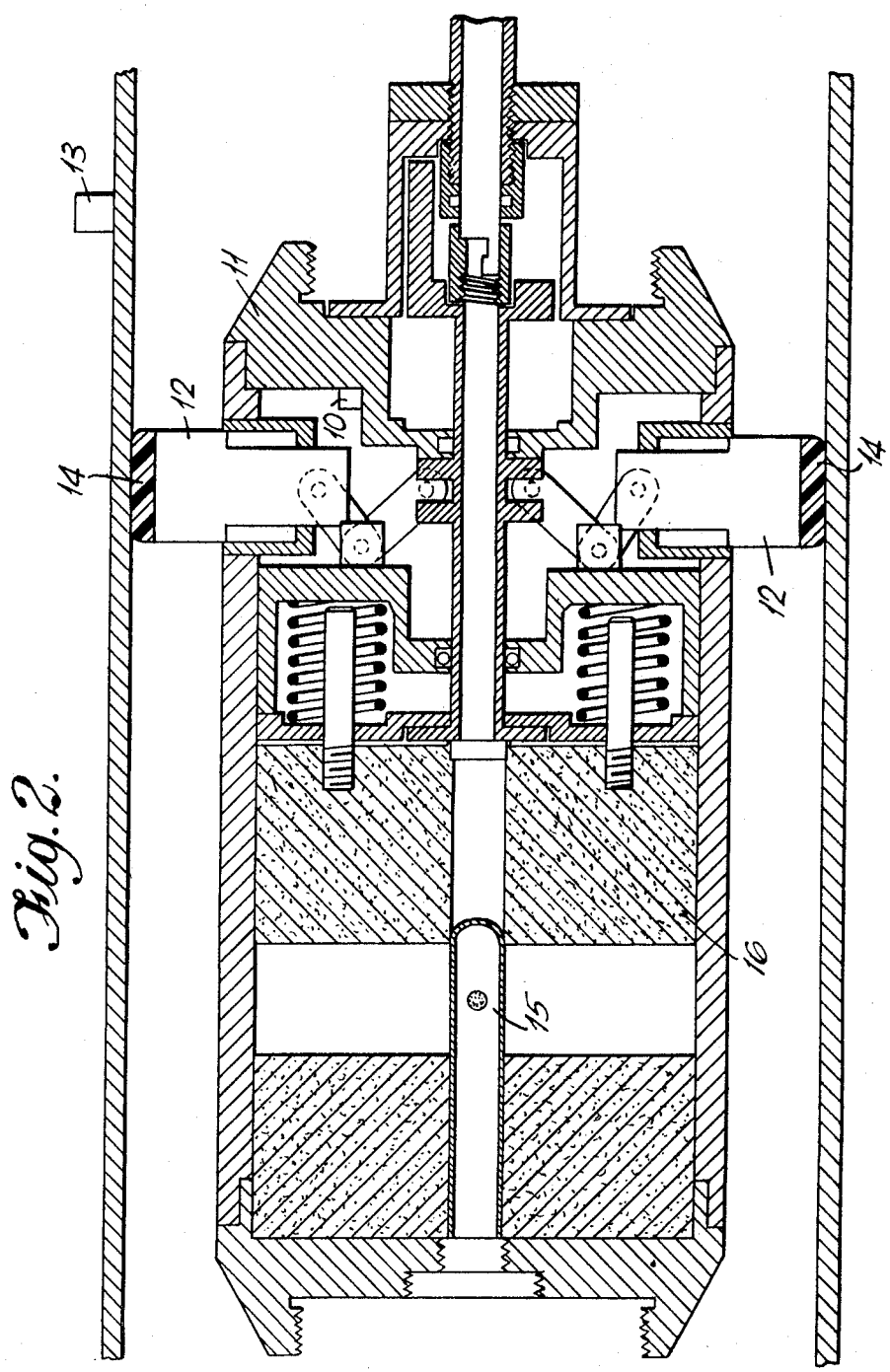

EQUIPMENT FOR RADIOGRAPHY OF PIPELINES AND CLOSED VESSELS

This invention relates to pipeline crawlers and has particular application in crawlers designed for the inspection of pipelines.

One method of examining pipelines is to position a radiation source within the pipe at the location of a weld, provide a radiation sensitive device such as film around the outside of the pipe and then expose the source. With such an exposed internal source, difficulties have been found in ensuring operational safety required in handling radioactive matter and precise positioning of the source inside the pipeline.

It is an object of the invention to provide a pipeline crawler which can be accurately controlled and positioned from outside a pipeline.

According to the present invention a pipeline crawler comprises a self-propelled vehicle designed to travel within a pipe, braking means for the vehicle and a radiation detector carried by the vehicle and energized from a source outside the pipe to cause operation of the braking means to stop the vehicle at a predetermined position within the pipe relative to such a source.

Preferably a shield is provided for the detector which is positioned next to the detector to shield the detector from any external source until the detector becomes accurately aligned with such source.

In order that the invention may be more fully understood reference will now be made to the accompanying drawings in which:

FIG. 1 is a general view of a pipeline crawler embodying the invention,

FIG. 2 is a section through the part of the crawler containing the radiation source.

Referring now to FIG. 1 there is shown therein a pipeline crawler comprising two parts. The front part 1 contains a drive means which may comprise any convenient engine or motor 4 but preferably is a battery-operated electric motor. The rear part 2 of the crawler contains a radiation source and shield and control equipment. The two parts of the crawler are joined together by a universal joint protected by a flexible bellows 3. Alternatively, the crawler can comprise one part only having both motor and source. The crawler is supported within a pipe by sets of two or more castor wheels, such as wheels 5, 6 and 7 positioned around the circumference of both parts of the crawler. These castor wheels are sprung radially outwardly so as to allow the crawler to be accommodated within pipes of different diameters. In order to ensure a good grip on the internal surface of a pipe which may be coated with oil, or chemicals, the castor wheels are fitted with tires of rubber or other similar material which may include inserts of high friction material of the kind used in brake linings. Also to improve adhesion inserts of magnetic material can be provided preferably embedded in the tire so that they are below its surface. The shape of the tires may be part-spherical with a radius corresponding to the radius of the pipe.

Where the crawler is used for the inspection of pipeline welds it is important that it can be accurately stopped at a predetermined location. Since the crawler is invisible within the pipe this is rather difficult and it is an important feature of the invention that means are provided for accurately stopping the crawler at predetermined locations. In order to achieve this the pipeline crawler carries a radiation detector. A weak radiation source positioned outside the pipe will then energize the radiation detector when it reaches a position in set proximity to the source and energization of the radiation detector on the pipe causes operation of powerful brakes provided on the crawler and at the same time the de-energization of the motor. The radiation detector and brakes are shown more clearly in the sectional view of FIG. 2. Here it will be seen that radiation detector 10 is positioned behind a shield 11 for radiation such that where radiation from a source 13 outside the pipe is provided shield 11 acts to cut off this radiation until the detector has moved to a position which is radially in line with the external source. When this occurs the detector becomes energized and causes a set of brakes 12 to move radially outwardly against the internal surface of the pipe. The outer surfaces 14 of brake 12 are provided with suitable friction material for gripping the pipe. In order to assist in the accurate positioning of the pipeline crawler the external source may be also provided with shielding and a collimating slit extending radially inwardly relative to the pipe so that very little of the radiation from the external source can pass in a direction other than in a plane radially of the pipe. Similarly the detector 10 is shielded against all radiation eminating from a direction other than radial.

The rear part of the crawler carries the actual radiographic radiation source 15 and a shield 16 therefor, the shield constitutes the major part of the weight of the rear part of the pipe crawler. The radiation shield is movable and has two positions open and closed. It is normally in the closed position so as to protect the environment against the hazards of the radiation from the source. When the pipeline crawler has been stopped by actuation of the detector by external beam in addition to the motor being de-energized and brakes being applied the shield is operated to be moved into its open position and expose the source for the taking of a radiographic film, positioned outside the pipe. The crawler also carries a timing mechanism which commences to operate on energization of the detector and after a predetermined time interval sufficient to fully expose any film the timing mechanism operates to move the shield into its closed position, remove the brake and restart the motor.

In addition to the radiation detector mentioned above other radiation detectors in various geometrical positions may be provided for different purposes, for example to reverse the motor and cause it to return to the beginning of the pipe. Such radiation detectors may be positioned at different angular locations around the pipe crawler and each may be appropriately collimated and shielded.

Where it is desired to obtain radiographic images of a weld from a number of different positions a plurality of detectors may be provided on the crawler spaced apart in the direction of motion by amounts equal to the desired spacing of the exposures. The external source energizes each of these detectors in turn so that the main radiation source on the crawler is exposed at a plurality of positions in sequence, the positions of all of which are determined by the location of the single external source.

I claim:
1. A pipeline crawler comprising:
    a self propelled vehicle designed to travel within a pipe,
    positive frictional braking means for the vehicle,
    a radiation detector carried by the vehicle and energized from a source outside the pipe to cause operation of the positive braking means and thereby positively stop the vehicle at a predetermined position relative to such a source, and
    a radiation shield means provided for the detector and which shield is positioned next to the detector to substantially prevent energization of the detector except at a predetermined position relative to an external source.
2. The crawler as claimed in claim 1 in which the positive frictional braking means comprises:
    a plurality of brake blocks, and
    actuating means for forcing the blocks radially outwardly against the internal surface of the pipe.
3. The crawler as claimed in claim 1 in which the vehicle is articulated and comprises two parts coupled together by a universal joint, one part carrying drive means and the other part carrying a pipeline inspection device.
4. The crawler as claimed in claim 1 in which the crawler carries a radiation source for pipeline inspection.
5. The crawler as claimed in claim 4 in which a movable shield is provided for the radiation source which has a closed position completely shielding the source and an open position exposing the source, the shield being normally in the closed position, and in which energization of the radiation detector causes movement of the shield into the open position.

6. The crawler as claimed in claim 5 in which timing means are provided for returning the shield to the closed position after being in the open position for a predetermined time.

7. The crawler as claimed in claim 1 in which the vehicle is driven by castor wheels sprung radially outwardly.

* * * * *